United States Patent
Anderson et al.

(10) Patent No.: US 11,782,572 B2
(45) Date of Patent: *Oct. 10, 2023

(54) PRIORITIZATION FOR PRESENTATION OF MEDIA BASED ON SENSOR DATA COLLECTED BY WEARABLE SENSOR DEVICES

(71) Applicant: Intel Corporation, Santa Clara, CA (US)

(72) Inventors: Glen J. Anderson, Beaverton, OR (US); Carl S. Marshall, Portland, OR (US); Jeffrey R. Jackson, Newberg, OR (US); Selvakumar Panneer, Hillsboro, OR (US); Andrea E. Johnson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 16/889,584

(22) Filed: Jun. 1, 2020

(65) Prior Publication Data

US 2020/0293179 A1    Sep. 17, 2020

Related U.S. Application Data

(63) Continuation of application No. 15/087,816, filed on Mar. 31, 2016, now Pat. No. 10,678,398.

(51) Int. Cl.
*G06F 3/00* (2006.01)
*G06F 3/04817* (2022.01)
(Continued)

(52) U.S. Cl.
CPC .......... *G06F 3/04817* (2013.01); *G06F 3/005* (2013.01); *G06F 3/011* (2013.01);
(Continued)

(58) Field of Classification Search
CPC ...... G06F 16/54; G06F 16/5866; G06F 3/005; G06F 3/011; G06F 3/015; G06F 3/04817
(Continued)

(56) References Cited

U.S. PATENT DOCUMENTS 6,424,789 B1    7/2002  Abdel-mottaleb
7,443,418 B2   10/2008  Bryant
(Continued)

FOREIGN PATENT DOCUMENTS

KR    100779661 B1    11/2007
KR    20090112349 A   10/2009
(Continued)

OTHER PUBLICATIONS

Schoeffmann et al., "Video browsing interfaces and applications: a review," SPIE Reviews, vol. 1, (2010), 35 pages.
(Continued)

*Primary Examiner* — Vincent F Boccio
(74) *Attorney, Agent, or Firm* — Schwabe, Williamson & Wyatt, P.C.

(57) ABSTRACT

Apparatuses, methods, and storage medium associated with a browser for prioritized display of videos and/or photographs are disclosed herein. In embodiments, an apparatus may include one or more processors, devices, and/or circuitry to operate a browser to present a plurality of photos and/or videos for viewing. A subset of the plurality of the photos and/or videos may be selected based on the results of an analysis of sensor data collected by a plurality of wearable sensors. The subset of the plurality of the photos and/or videos may be prioritized over other photos and/or videos from the plurality of the photos and/or videos in terms of presentation space allocated for presentation.

25 Claims, 9 Drawing Sheets

(51) Int. Cl.
*G06F 16/54* (2019.01)
*G06F 16/58* (2019.01)
*G06F 3/01* (2006.01)

(52) U.S. Cl.
CPC .............. *G06F 3/015* (2013.01); *G06F 16/54* (2019.01); *G06F 16/5866* (2019.01)

(58) Field of Classification Search
USPC ........................................................ 707/734
See application file for complete search history.

(56) References Cited

U.S. PATENT DOCUMENTS

| | | | |
|---|---|---|---|
| 8,269,175 B2 | 9/2012 | Alameh | |
| 8,994,613 B1 | 3/2015 | Johnson | |
| 2003/0090504 A1 | 5/2003 | Brook et al. | |
| 2004/0034829 A1 | 2/2004 | Ohashi et al. | |
| 2004/0201691 A1 | 10/2004 | Bryan et al. | |
| 2005/0033760 A1 | 2/2005 | Fuller et al. | |
| 2008/0209339 A1 | 8/2008 | Macadaan et al. | |
| 2009/0006082 A1 | 1/2009 | Harris | |
| 2009/0209335 A1 | 8/2009 | Pearce | |
| 2011/0071792 A1 | 3/2011 | Miner | |
| 2011/0313649 A1 | 12/2011 | Bales et al. | |
| 2012/0052972 A1 | 3/2012 | Bentley | |
| 2012/0263439 A1 | 10/2012 | Lassman et al. | |
| 2012/0308209 A1 | 12/2012 | Zaletel | |
| 2013/0125000 A1 | 5/2013 | Fleischhauer et al. | |
| 2014/0334796 A1* | 11/2014 | Galant .................. | G11B 27/28 386/241 |
| 2014/0347265 A1 | 11/2014 | Aimone et al. | |
| 2015/0043886 A1 | 2/2015 | Bang et al. | |
| 2015/0103164 A1 | 4/2015 | Kallstrom et al. | |
| 2015/0154452 A1 | 6/2015 | Bentley | |
| 2015/0168727 A1 | 6/2015 | Quaddoura | |
| 2015/0227784 A1 | 8/2015 | Roy | |
| 2015/0262617 A1 | 9/2015 | Jaime et al. | |
| 2015/0318020 A1 | 11/2015 | Pribula | |
| 2016/0049173 A1 | 2/2016 | Anderson et al. | |
| 2016/0225410 A1 | 8/2016 | Lee et al. | |

FOREIGN PATENT DOCUMENTS

| | | |
|---|---|---|
| WO | WO2009094611 A3 | 7/2009 |
| WO | WO2015072631 A1 | 5/2015 |
| WO | WO2016025086 A1 | 2/2016 |

OTHER PUBLICATIONS

Barr et al., "Face Recognition From Video: a Review," International Journal of Pattern Recognition and Artificial Intelligence, Apr. 20, 2012, 56 pages.
Ding et al., "A Comprehensive Survey on Pose-Invariant Face Recognition," ACM Transactions on Intelligent Systems and Technology, Feb. 2015, 41 pages.
Ke et al., "A Review on Video-Based Human Activity Recognition," Computers, (2013), pp. 88-131.
Zeng et al., "A Survey of Affect Recognition Methods: Audio, Visual and Spontaneous Expressions," IEEE Transactions On Pattern Analysis and Machine Intelligence, vol. 31, No. 1, Jan. 2009, pp. 39-58.
Schoeffmann et al., "The Video Browser Showdown: a live evaluation of interactive video search tools," International Journal of Multimedia Information Retrieval, Dec. 31, 2015, 15 pages.
Anderson et al., "Techniques to Save or Delete a Video Clip", U.S. Appl. No. 14/750,426, filed Jun. 25, 2015, 63 pages.
International Search Report and Written Opinion dated Oct. 16, 2015 for International Application No. PCT/US2015/037618, 11 pages.
Non-Final Office Action dated Feb. 1, 2016 for U.S. Appl. No. 14/459,229, 11 pages.
Final Office Action dated Jun. 9, 2016 for U.S. Appl. No. 14/459,229, 13 pages.
International Search Report and Written Opinion dated Sep. 8, 2016 for International Application No. PCT/US2016/034171, 16 pages.
Avlonitis et al., "Video Pulses: User-Based Modeling of Interesting Video Segments," Advances in Multimedia, vol. 2014, Jan. 12, 2014, 10 pages.
Office Action dated Dec. 1, 2016 for U.S. Appl. No. 14/750,426, 13 pages.
Final Office Action dated Apr. 5, 2017 for U.S. Appl. No. 14/750,426, 11 pages.
Office Action dated Feb. 28, 2017 for U.S. Appl. No. 14/459,229, 14 pages.
Office Action dated Aug. 11, 2017 for U.S. Appl. No. 14/459,229, 13 pages.
Advisory Action dated Jun. 20, 2017 for U.S. Appl. No. 14/750,426, 3 pages.
Office Action dated Nov. 9, 2017 for U.S. Appl. No. 14/750,426, 5 pages.
Office Action dated Apr. 18, 2019 for U.S. Appl. No. 15/087,816, 31 pages.
Final Office Action dated Sep. 25, 2019 for U.S. Appl. No. 15/087,816, 27 pages.

* cited by examiner

Computer-readable storage medium
902

Program Instructions 904
To cause a device, in response to execution of the program instructions, to practice (aspects of) embodiments of the process(es) described throughout this disclosure.

FIGURE 9

PRIORITIZATION FOR PRESENTATION OF MEDIA BASED ON SENSOR DATA COLLECTED BY WEARABLE SENSOR DEVICES

RELATED APPLICATION

This application is a continuation application of U.S. patent application Ser. No. 15/087,816, filed on Mar. 31, 2016, entitled "PRIORITIZATION FOR PRESENTATION OF MEDIA BASED ON SENSOR DATA COLLECTED BY WEARABLE SENSOR DEVICES," now U.S. Pat. No. 10,678,398. The Specification of application Ser. No. 15/087,816 is hereby fully incorporated by reference.

TECHNICAL FIELD

The present disclosure relates to media presentation on a computer device. More particularly, the present disclosure relates to a browser system for prioritized presentation of media utilizing wearable sensors.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In presenting media on a computer device, there is a strong desire to present media with media of higher relevance to a search query in a preferred position. Legacy presentation methods and apparatuses have performed textual analysis to determine which media is of the highest relevance to the search query and presented the media with the highest relevance at a top of a presentation of the media. In many situations, data captured by the media can be ignored in determining relevance and the relevance of the media may be lost to a viewer in the presentation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 9 illustrates an example computer-readable storage medium that may be suitable for use to store instructions that cause an apparatus, in response to execution of the instructions by the apparatus, to practice selected aspects of the present disclosure.

DETAILED DESCRIPTION

Figure 1:
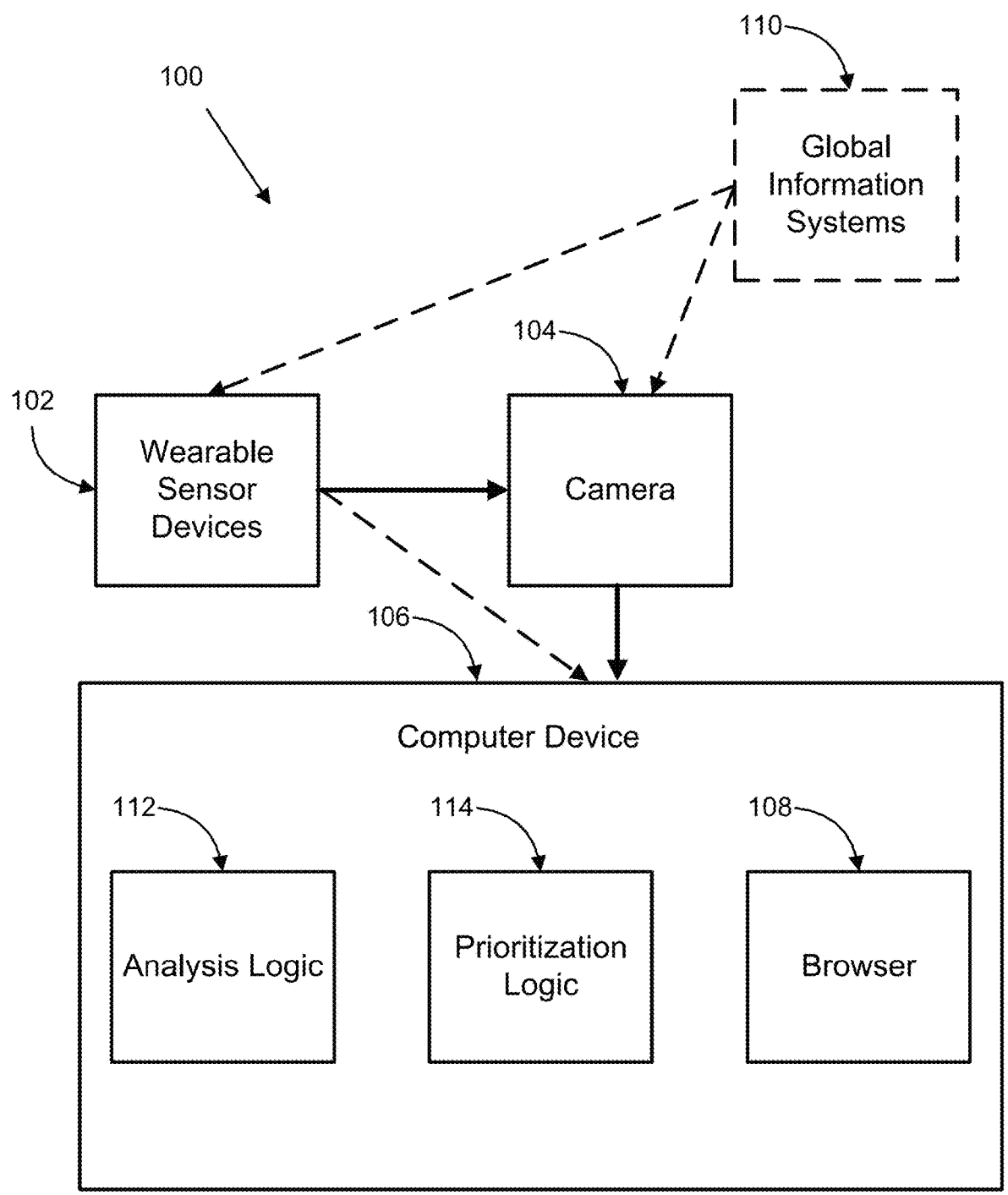
FIG. 1 illustrates an example system including a browser incorporated with teachings of the present disclosure for presentation of media, according to various embodiments.

Apparatuses, systems, methods, and storage medium associated with a browser for prioritized display of videos and/or photographs are disclosed herein. In embodiments, an apparatus may include one or more processors, devices, and/or circuitry to operate a browser to present a plurality of photos and/or videos for viewing. A subset of the plurality of the photos and/or videos may be selected based on the results of an analysis of sensor data collected by a plurality of wearable sensors. The subset of the plurality of the photos and/or videos may be prioritized over other photos and/or videos from the plurality of the photos and/or videos in terms of presentation space allocated for presentation.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an example system 100 including a browser 108 incorporated with teachings of the present disclosure for presentation of media, according to various embodiments. The system may include one or more wearable sensor devices 102, a camera 104 and a computer device 106 that operates the browser 108. In some embodiments, the system may further include one or more global information systems (GIS) 110 communicatively coupled to the wearable sensor devices 102, the camera 104, or some combination thereof.

The one or more wearable sensor devices 102 may include sensors and/or sensor devices that may be affixed to a subject, sensors and/or sensor devices affixed to, or built into, an object, or some combination thereof. The wearable sensor devices 102 may include motion sensors and/or motion sensor devices that may capture movement, acceleration, or some combination thereof of the motion sensors and/or motion sensor devices. The wearable sensor devices 102 may capture biometric data of a wearer, such as heart rate, breathing patterns, body temperature, or some combination thereof. The wearable sensor devices 102 may further or alternatively capture data related to the surrounding environment, including sound, temperature, humidity, light, pressure being applied to the sensors, or some combination thereof.

In some embodiments, the wearable sensor devices 102 may be coupled to the GIS 110 for obtaining additional data that may be associated with all or a portion of the data captured for the wearable sensor devices 102. The GIS 110 may include a global positioning system (GPS) for determining locations of elements, including the wearable sensor devices 102, coupled to the GIS 110, a global clock, an identifier generation system, or some combination thereof. The wearable sensor devices 102 may be configured to obtain any of the information from the GIS 110 and associate the information with data captured by the wearable sensor device 102. For example, the wearable sensor devices 102 may obtain the time from the GIS 110 and may embed the time as a timestamp in metadata for data captured by the wearable sensor devices 102 at that time.

The camera 104 may be utilized for capturing and/or generating photographs, videos, or some combination thereof. The camera 104 may include a two-dimensional camera, a three-dimensional camera, an infrared camera, an RGB camera, a depth camera, or some combination thereof. The cameras may capture facial expressions of a subject, light levels, hand gestures, or some combination thereof.

The photographs and/or videos captured and/or generated by the camera 104 may be of an image that includes the wearable sensor devices 102 or some portion thereof, e.g., visual outputs having sensor data on displays/screens of wearable sensor devices 102. In response to capturing and/or generating the image that includes the wearable sensor devices 102 (or the visual outputs on their displays/screens), the camera 104 may generate images having sensor data from the wearable sensor devices 102, extract the sensor data from the generated images, and associate the sensor data with the captured images. Associating the sensor data with the captured images may include embedding, by the camera 104, the sensor data as metadata within the captured images.

In some instances, an image captured and/or generated by the camera 104 may include some portion of the wearable sensor devices 102. The camera 104 may be able to determine the portion of the wearable sensor devices 102 captured by the image based on information received from the wearable sensor devices 102, some component of the wearable sensor devices 102 for which the camera 104 can sense the location of the wearable sensor devices 102, global positioning data received from the GIS 110 and/or the wearable sensor devices 102, or some combination thereof. Accordingly, the camera 104 may be able to determine which wearable sensor devices 102 are captured by the image and may identify the received sensor data associated with those wearable sensor devices 102 based on an identifier received with the sensor data that indicates the data was transmitted by a particular wearable sensor device.

In alternate embodiments, the wearable sensor devices 102 may be communicatively coupled to the camera 104 and may broadcast the most recent sensor data to the camera 104. In response to the camera 104 capturing a photograph and/or a video, the camera 104 may identify a timestamp (or another identifier indicating a time of capture) for the photograph and/or video and search the sensor data from the wearable sensor devices 102 for sensor data corresponding to the timestamp (or other identifier) based on the timestamp (or other identifier) received with the sensor data. The camera 104 may associate the sensor data that includes the corresponding timestamp with the photograph and/or video. In some embodiments, associating the sensor data includes embedding the sensor data as metadata of the photograph and/or video.

In other embodiments, the camera 104 may transmit a request to the wearable sensor devices 102 in response to capturing a photograph and/or video. The request from the camera 104 may include an indication of one or more timestamps associated with the photograph and/or the video. In response to receiving the request, the wearable sensor devices 102 may identify the captured sensor data associated with the one or more timestamps and transmit the captured sensor data to the camera 104 for association with the photograph and/or video.

In some embodiments, the camera 104 may be able to determine which wearable sensor devices 102 are located within a proximity of the image captured and/or generated by the camera 104. The wearable sensor devices 102 located within a proximity of the image may include wearable sensor devices 102 worn by a photographer operating the camera 104, a videographer operating the camera 104, a third person within the vicinity of the camera 104, or some combination thereof. The camera 104 may further or alternatively receive and/or request sensor data from the wearable sensor devices 102 within the proximity of the of the image captured and/or generated by the camera 104 and associate the sensor data with the image.

The camera 104 may transmit one or more photographs and/or videos to the computer device 106. The camera 104 may transmit the one or more photographs and/or videos in response to the one or more photographs and/or videos being captured by the camera 104, at set intervals, upon the occurrence of a predetermined event, in response to a request received from the computer device 106, or some combination thereof. In some embodiments, the computer device 106 may generate the request sent by the computer device 106 in response to a search initiated in the browser 108 operating on the computer device 106. The computer device 106 may store the photographs and/or videos on a memory of the computer device 106 in response to receiving the photographs and/or videos.

In some embodiments, an intermediate storage device, such as a server, may be located intermediate the camera 104 and the computer device 106. The intermediate storage device may be operated by a content provider. The camera 104 may transmit the captured photographs and/or videos to the intermediate storage device for storage in response to capturing the photographs and/or videos, at set intervals, upon the occurrence of a predetermined event, or in response to a request received from the intermediate storage device.

The intermediate storage device may store the photographs and/or videos and provide the photographs and/or videos to the computer device 106 in response to a request received from the computer device 106. The request from the computer device 106 may include criteria for determining which photographs and/or videos should be provided from the intermediate storage device to the computer device 106. The criteria may indicate that photographs and/or videos with embedded sensor data from the wearable sensors devices 102 should be provided, photographs and/or videos with embedded sensor data that exceeds or is below a threshold value should be provided, photographs and/or videos with relevance to a particular search query should be provided, or some combination thereof. In some embodiments, the intermediate storage device may select a subset of the photographs and/or videos to be provided to the computer device 106 which should be prioritized based on the criteria.

In some embodiments, the camera 104 may provide the images with sensor data to computer device 106, with the computer device 106 performing the extraction of the sensor data from the images.

In other embodiments, where sensor data is provided separately and not embedded within the images, the wearable sensor devices 102 may provide the sensor data directly to the computer device 106. In these embodiments, the computer device 106 may perform any of the operations with the videos and/or photographs and the sensor data described above as being performed by the camera 104, including embedding the sensor data with the corresponding videos and/or photographs, associating the sensor data with the corresponding videos and/or photographs, determining if any and which portion of the wearable sensor devices 102 appear in the videos and/or photographs, or some combination thereof.

The browser 108, operating on the computer device 106, may generate the request for the photographs and/or videos and the sensor data from the camera 104, the intermediate device, the memory of the computer device 106, the wearable sensor device 102, or some combination thereof. The browser 108 may determine a layout for display of the photographs and/or videos on a display screen of the computer device 106. The layout may include one or more presentation spaces allocated for displaying the photographs and/or videos. The presentation spaces may be predefined (either by the browser 108, a browser configuration, or by user configuration), may be dynamically assigned based on a level of determined interest based on results of an analysis of the sensor data associated with each of the photographs and/or videos, or some combination thereof.

Analysis logic 112 may perform analysis of sensor data associated with each of the photographs and/or videos to determine which of the photographs and/or videos may be of the greatest interest to a viewer of the browser 108. Determining the level of interest may include analyzing the sensor data for values that exceed or are below a threshold value corresponding to one or more measurements or sensor values within the sensor data. The photographs and/or videos associated with measurements or sensor values that exceed/below the corresponding threshold value may be determined to be of higher interest than the photographs and/or videos that are associated with measurements or sensor values that do not exceed the corresponding threshold value. For example, in instances where the wearable sensor device includes a motion sensor, photographs and/or videos associated with a sensor value that exceeds or is below a threshold acceleration value may be determined to be of more interest to a viewer than those that do not exceed or are not below the threshold acceleration value.

In some embodiments, the browser 108 may receive a search query (textual inquiry and/or voice-recognition inquiry) and may provide the search query to the analysis logic 112 to perform analysis of the photographs and/or videos. The analysis logic 112 may determine interest of each of the photographs and/or videos based on the search query. The analysis logic 112 may perform textual analysis on the search query and determine one or more particular sensor data measurements, visual analytics, sound analytics, or some combination thereof that are of interest.

In addition to the sensor data captured by the wearable sensor devices 102, the analysis logic 112 may utilize visual (video or photograph) analytics and/or sound analytics for determining an amount of interest based on the search query. The visual analytics may include face recognition, event recognition, landscape recognition, or some combination thereof for determining the amount of interest. The sound analytics may include sound recognition for determining the amount of interest.

The analysis logic 112 may assign a level of interest to each of the photographs and/or videos based on the analysis of the sensor data, the visual analytics, the sound analytics, or some combination thereof. The weighting for determining the level of interest based on the sensor data, the visual analytics and/or the sound analytics may vary depending on the search query received from the browser 108.

For example, if the search query is of a name, the facial recognition of the visual analytics may receive a greater weight in assigning the level of interest than other factors. If the name 'John Doe' is inserted as the search query within the browser 108, the browser 108 may provide the name 'John Doe,' a picture of a person associated with the name 'John Doe,' analytical data for identifying an individual associated with the name 'John Doe' within a photograph and/or a video to the analysis logic 112, or some combination thereof. The analysis logic 112 may utilize the information provided by the browser 108 to determine which pictures and/or videos include the individual associated with the name 'John Doe.' The analysis logic 112 may assign a weighting level of 5 (with greater weighting levels given more weight in the assigning of the level of interest) for facial recognition analysis of the photographs and/or videos, assign a weighting level of 2 for data from the wearable sensor devices 102, a weighting level of 1 for sound analysis and a weighting level of 0 to location analysis.

As a further example, if the search query is an activity, landscape recognition or sound analytics for identifying landscapes or sounds that may be associated with the activity may receive a greater weight in assigning the level of interest than other factors.

Based on the levels of interest associated with the photographs and/or videos, prioritization logic 114 may determine in which presentation spaces to display each of the photographs and/or videos, which portion of the photographs and/or videos to display, or some combination thereof. The prioritization logic 114 may determine that photographs and/or videos associated with higher levels of interest are to be displayed in preferred presentation spaces, while the other photographs and/or videos may be displayed in regular presentation spaces or not displayed. The preferred presentation spaces may include larger presentation spaces, presentation spaces located at certain locations, or some combination thereof. In some embodiments, the prioritization logic 114 may assign priority levels associated with presentation spaces allocated greater amounts of presentation space to photographs and/or videos with high levels of interest, whereas photographs and/or videos with lower levels of interest may be assigned priority levels associated with presentation spaces allocated lesser amounts of presentation space.

The browser 108 may cause the computer device 106 to display a browser display on the display screen of the computer device 106, or any other display screen coupled to the computer device 106. The browser display may include a graphical user interface (GUI) that displays each of the photographs and/or videos displayed in the determined presentation spaces based on the prioritization performed the prioritization logic 114 and/or the assigned priority levels. In some embodiments, the browser display may further include elements for interaction, such as a field for entry of the search query, interactive icons that cause the browser 108 to perform an action in response to selection, portions of the browser display that may be selected and that cause the browser 108 to perform an action in response to the selection, or some combination thereof.

Figure 2:
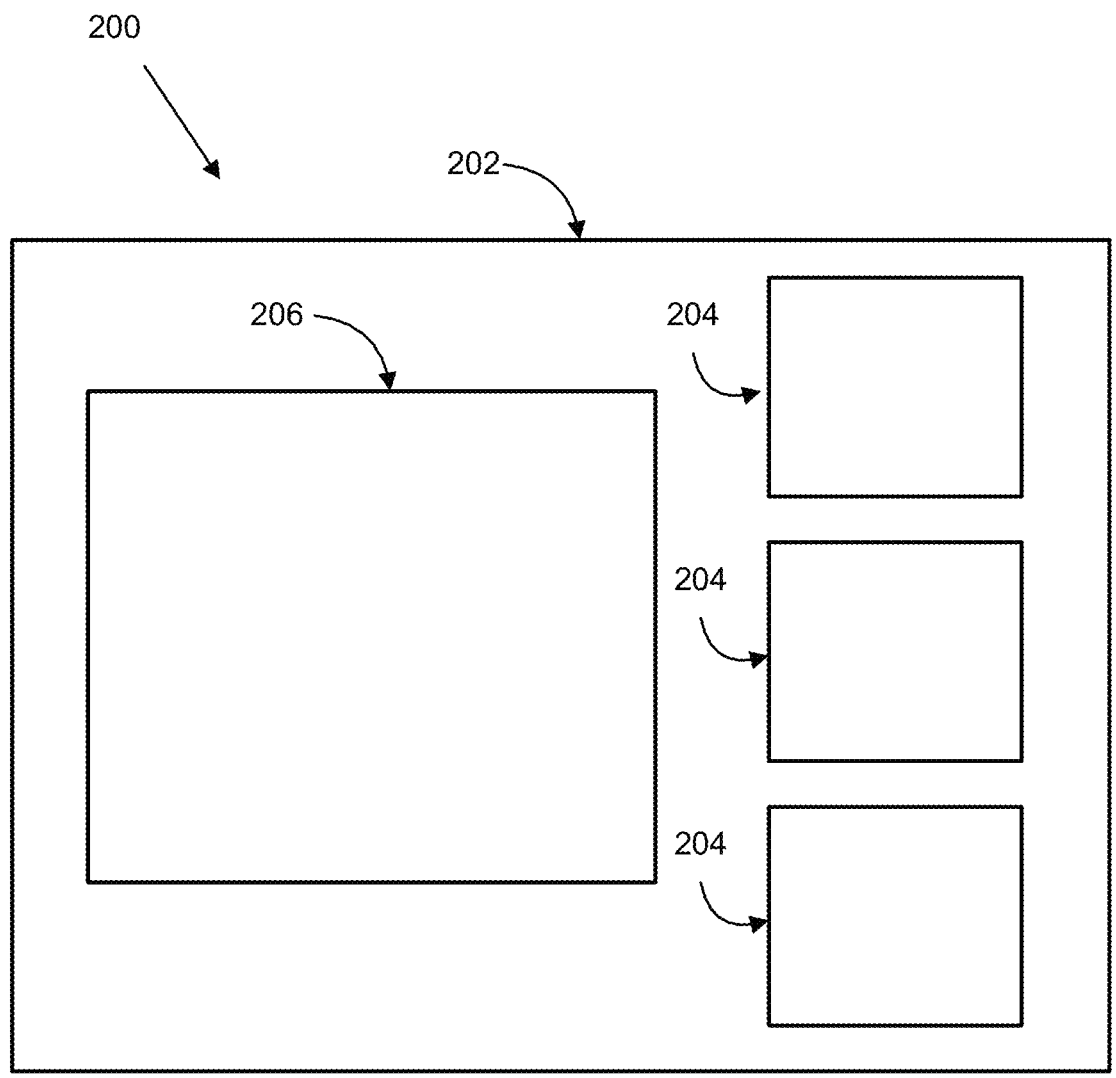
FIG. 2 illustrates an example browser media presentation layout, according to various embodiments.

FIG. 2 illustrates an example browser media presentation layout 200, according to various embodiments. A browser, such as browser 108 of FIG. 1, may define the browser media presentation layout 200. The browser media presentation layout 200 may include a browser display 202. The browser display 202 may include a design, one or more elements for interaction, one or more other display elements, or some combination thereof. In some embodiments, the browser display 202 may dynamically adjust size to fit a display screen (such as the display screen coupled to the computer device 106), a viewport, a browser window, or some combination thereof.

The browser media presentation layout 200 may further include one or more presentation spaces (including preferred presentation space 206 and regular presentation spaces 204) for displaying photographs and/or videos, as described in relation to the browser 108 of FIG. 1. The browser may display the presentation spaces within the browser display 202.

The preferred presentation space 206 may include a display space of the browser display 202 designated to be more conspicuous to a viewer of the browser display 202. The preferred presentation space 206 may have a larger allocated display space than the regular presentation spaces 204. The browser 108 of FIG. 1, the computer device 106 of FIG. 1, a user of the browser 108, a viewer of the browser display 202, or some combination thereof, may predetermine the size of the preferred presentation space 206. In some embodiments, the browser 108, the computer device 106, a user of the browser 108, a viewer of the browser display 202, or some combination thereof, may determine and allocate the size of the preferred presentation space 206 based on an amount of interest and/or priority level for the video or photograph to be displayed within the preferred presentation space 206.

In some embodiments, the browser 108 may allocate the display space for the preferred presentation space 206 based on locations or areas within the browser display 202 designated to be conspicuous to a viewer of the browser display 202. This methodology for allocation may be implemented in conjunction with or alternatively to the larger size allocation for the preferred presentation space 206 described throughout this disclosure. The conspicuous locations for allocation of the display space for the preferred presentation space 206 may include locations toward the top portion of the browser display 202 and/or toward the left portion of the browser display 202.

In some embodiments, the browser 108 may determine the conspicuous locations based on prior interactions with the browser display 202. For example, the browser 108 may determine that locations within the browser display 202 where greater amounts of interaction occurred are more conspicuous than locations where there was less interaction.

While the browser media presentation layout 200 has been described as having a single preferred presentation space 206, it is to be understood that there may be multiple preferred presentation spaces and/or multiple levels of preferred presentation spaces displayed within the browser display. For example, in some embodiments there may be one or more level-one preferred presentation spaces and one or more level-two preferred presentation spaces. The level-one preferred presentation spaces may be displayed in a more conspicuous size and/or location than the level-two preferred presentation spaces, which are displayed in a more conspicuous size and/or location than the regular presentation spaces 204.

Figure 3:
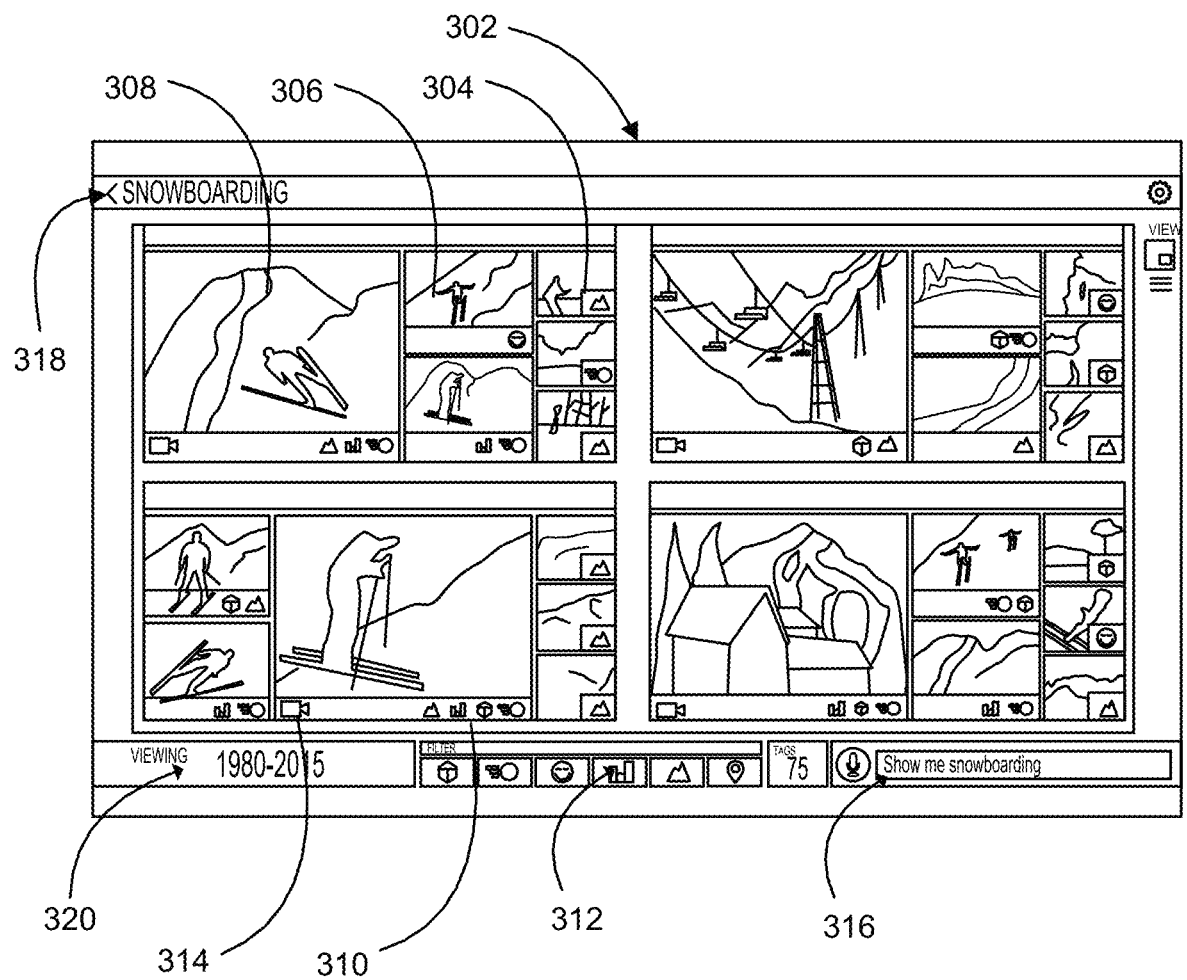
FIG. 3 illustrates an example browser display, according to various embodiments.

FIG. 3 illustrates an example browser display 302, according to various embodiments. The browser display 302 may include regular presentation spaces 304, level-two preferred presentation spaces 306, level-one preferred presentation spaces 308, or some combination thereof (collectively referred to as 'presentation spaces' in the description corresponding to FIG. 3). A browser, such as browser 108 of FIG. 1, may allocate the display space for each of the presentation spaces in accordance with the allocation described in relation to the preferred presentation spaces 206, the regular presentation spaces 204, the level-one preferred presentation spaces and/or the level-two preferred presentation spaces of, or described in relation to, FIG. 2.

In some embodiments, the browser may detect an interaction with the presentation spaces and may perform some function in response to detecting the interaction. In response to the browser detecting an interaction, the browser display 302 may display an editing feature of the browser (such as browser 108 of FIG. 1) allowing editing of the video and/or photograph displayed in the presentation space. In other embodiments, the browser may launch a separate program in response to interaction with a presentation space. The separate program may be an editing program to edit the video and/or photograph displayed in the presentation space, a media program for viewing the video and/or photograph displayed in the presentation space, a program or website for sharing the video and/or photograph displayed in the presentation space, or some combination thereof.

The browser may select the videos and/or photographs for display within the presentation spaces based on analysis of sensor data, visual analytics, sound analytics, or some combination thereof, as described in relation to FIG. 1. For each video and/or photograph to be displayed within the presentation spaces, the browser may indicate factors for why the video and/or photograph was selected for display by display of one or more factor icons 310 within the browser display. The browser may display the factor icons 310 as an overlay to each of the videos and/or photographs displayed within the presentation spaces, or in some other format that indicates the factor icon's 310 association with the corresponding video and/or photograph. The factor icons 310 may indicate to a viewer of the browser display 302 why the corresponding video and/or photograph was selected for display within the browser display 302.

The browser display 302 may further include a factor toolbar 312. The factor toolbar 312 may include one or more representations corresponding to the factor icons 310. In response to detection by the browser of an interaction with the representations within the factor toolbar 312, the browser display 302 may display a description of the representation corresponding to the interaction. For example, in response to a cursor being placed over the smiley face representation for a specified period of time, the browser display 302 may display a description that the smiley face representation corresponds to facial recognition.

In some embodiments, the browser may change the layout of browser display 302, the videos and/or photographs displayed within the browser display 302, or some combination thereof, in response to detection, by the browser, of an interaction with one or more of representations within the factor toolbar 312. For example, in response to the detection, by the browser, of an interaction with a representation within the factor toolbar 312, the browser display 302 may change to display videos and/or photographs associated with the factor corresponding to the representation, while videos and/or photographs not associated with the factor are suppressed from display.

The browser display may include an alternative angle icon 314 may be displayed as an overlay, or in some other format that indicates the alternative angle icon's 314 association with the corresponding video and/or photograph, for videos and/or photographs displayed within the browser display 302 that have corresponding videos and/or photographs showing an alternative angle of the objects captured within the videos and/or photographs. In response to interaction with the alternative angle icon 314, the browser display 302 may present one or more corresponding videos and/or photographs for a video and/or photograph associated with the alternative angle icon 314 which received the interaction. The interaction may include a cursor click on the alternative angle icon 314.

The browser 108 and/or the computer device 106 of FIG. 1 may determine that a video and/or photograph displayed within the browser display 302 has one or more corresponding videos and/or photographs that capture an alternative angle of one or more objects captured by the video and/or photograph based on the sensor data, the visual analytics, the sound analytics, or some combination thereof corresponding to the video and/or the photograph. In some embodiments, the browser 108 and/or computer device 106 may determine that an alternative angle was captured based on the wearable sensor devices (such as wearable sensor devices 102 of FIG. 1) captured within each of the videos and/or photographs and the time that each of the videos and/or photographs were captured. The browser 108 and/or the computer device 106 may further, or alternatively, determine that one or more videos and/or photographs capture alternative angles of an object based on identifying same or similar sounds captured by, or associated with, each of the videos and/or photographs.

The browser display 302 may further display a search query field 316. The search query field 316 may be to receive a search query for performance of a search as described in relation to FIG. 1, and the browser 108, the analysis logic 112, the prioritization logic 114 and/or the computer device 106 may perform the operations described in relation to the search query in FIG. 1 in response to reception of the search query by the search query field 316. The browser 108 and/or the computer device 106 may select the videos and/or photographs for display in the browser display 302 in response to the reception of the search query and/or the videos and/or photographs displayed in the browser display 302 may be updated in response to the reception of the search query.

In response to the browser display 302 displaying the videos and/or photographs associated with the search query, the browser display 302 may display a search query indicator 318. The search query indicator 318 may indicate the search query corresponding to the videos and/or photographs that are currently displayed in the browser display 302. In the illustrated example, the search query indicator 318 indicates that the search query is snowboarding and the videos and/or photographs currently displayed in the browser display 302 were selected based on their relation to snowboarding.

In some embodiments, the browser display 302 may include a display period indicator 320. The display period indicator 320 may indicate a time period for the videos and/or photographs displayed within the browser display 302. The time period indicator 320 may indicate a time period range extending from the earliest date of capture of the videos and/or photographs displayed to the most recent date of capture of the videos and/or photographs displayed.

In other embodiments, the display period indicator 320 may receive a time period input and may limit the time period for which the videos and/or photographs for display within the browser display 302 are selected. In response to determining the display period indicator 320 received a time period input, the browser 108 and/or the computer device 106 of FIG. 1 may update the videos and/or photographs displayed within the browser display 302 with videos and/or photographs captured within the time period, may limit the selection process of videos and/or photographs for display within the browser display 302 to videos and/or photographs captured within the time period, or some combination thereof.

Figure 4:
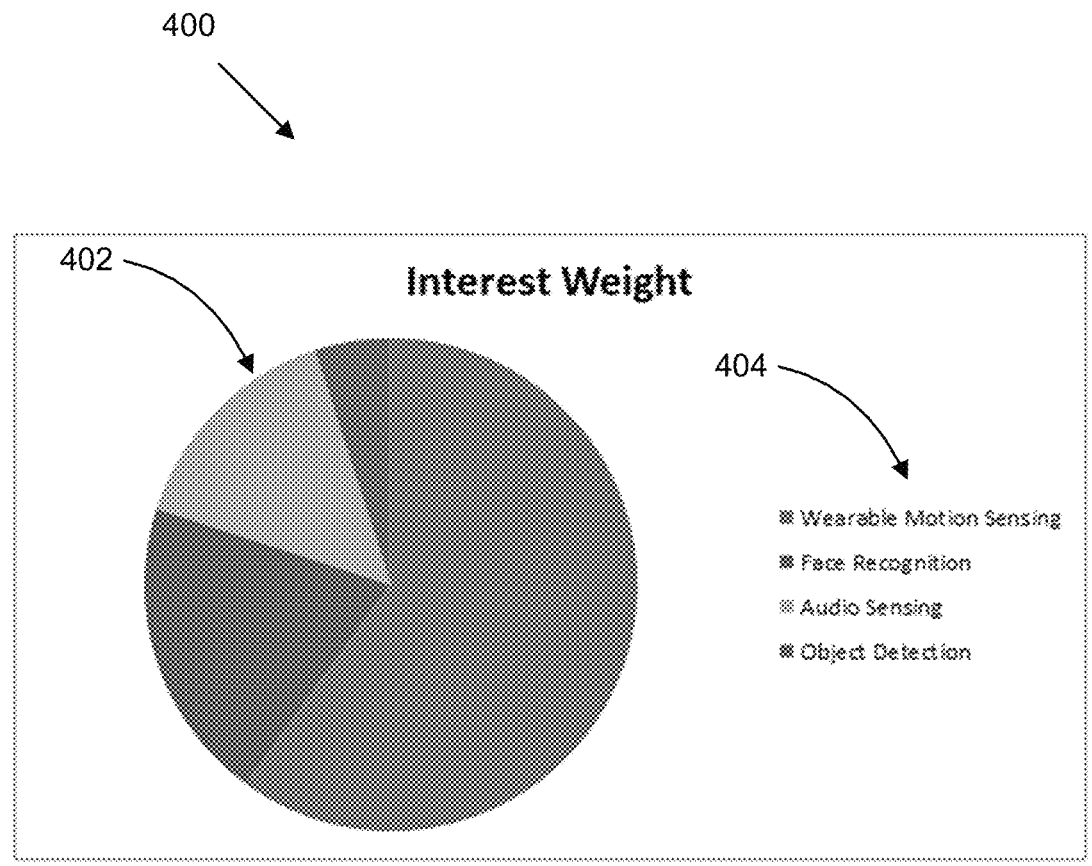
FIG. 4 illustrates an example interest graph display, according to various embodiments.

FIG. 4 illustrates an example interest graph display 400, according to various embodiments. The interest graph display 400 may include a graph 402 that indicates factors that contributed to a level of interest for a particular video and/or photograph and a weight that each of the factors contributed to the level of interest. The factors may include the factors represented by the factor icons 310 of FIG. 3 corresponding to the particular video and/or photograph. The graph 402 may indicate a percentage that each factor contributed to the total level of interest. The interest graph display 400 may further include a key identifying the factors illustrated within the graph 402. In some embodiments, the graph 402 may indicate an amount of interest that each factor contributed to the level of interest and a total level of interest score.

The browser 108, analysis logic 112 and/or the computer device 106 may generate the graph 402. The browser 108 and/or may display the graph 402 in the browser display, such as the browser display described in relation to FIG. 1 and/or the browser display 302 of FIG. 3, in response to interaction with one or more of the videos and/or photographs displayed in the browser display. The browser display may display the interest graph display 400 overlaid over the other contents displayed in the browser display in response to the interaction.

While the graph 402 is illustrated as a pie graph, it is to be understood that the graph 402 may be any other style of graph that may indicate contribution levels of each of the factors to the level of interest associated with a video and/or photograph. Additionally, it is to be understood that the graph 402 may further indicate subjects, objects, and/or other elements captured by the videos and/or photographs that contributed to level of interest and/or the amount that the subjects, objects, and/or other elements contributed to the level of interest.

Figure 5:
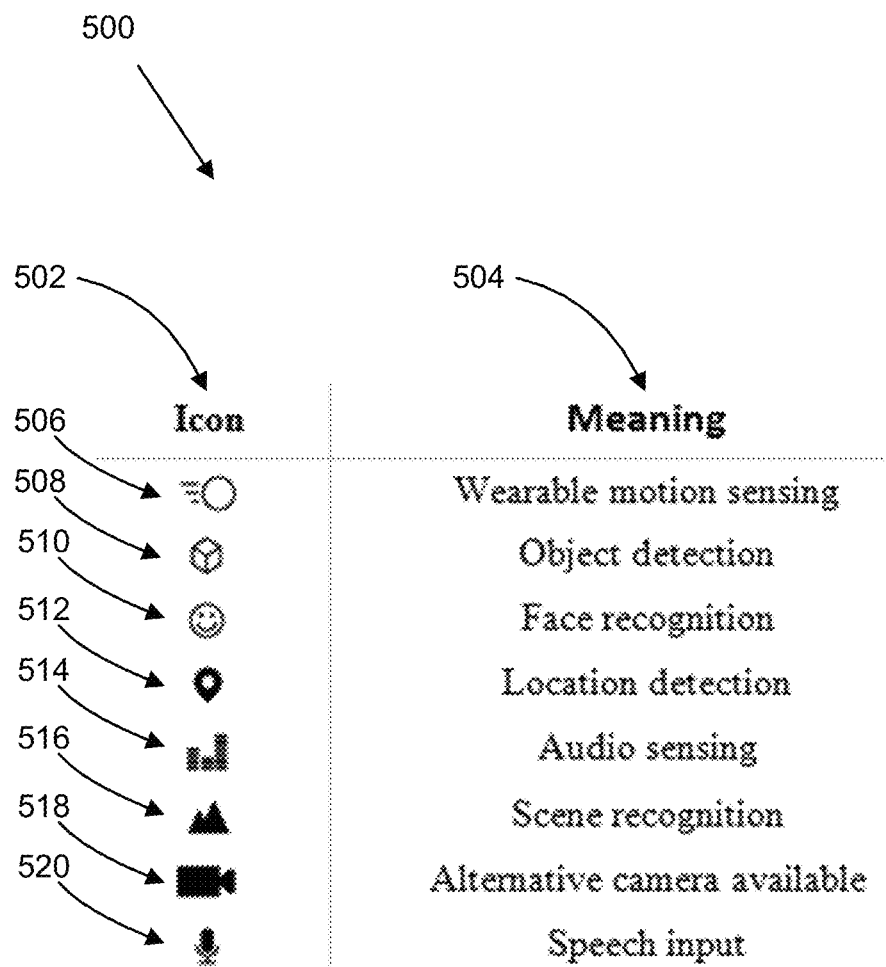
FIG. 5 illustrates an example factor icon table, according to various embodiments.

FIG. 5 illustrates an example factor icon table 500, according to various embodiments. The factor icon table 500 includes a list of icons 502 in a first column and a corresponding meaning 504 for each icon in a second column. The factor icons 310 of FIG. 3 may include one or more of the icons 502 listed in the factor icon table 500. In response to interaction with a representation within the toolbar 312 of FIG. 3, the browser display 302 of FIG. 3 may display the corresponding meaning 504 from the factor icon table 500 for the representation for which interaction occurred.

The list of icons 502 may include an icon that illustrates movement of an object, such as the ball with motion lines 506, associated with wearable motion sensing. The ball 506 may indicate that a photograph and/or video associated with the ball 506 captured wearable motion sensors, such as wearable motion sensors 102 of FIG. 1, includes data associated with wearable motion sensors, has data associated with wearable motion sensors attached to the photograph and/or video as metadata, or some combination thereof. In response to an interaction with the icon that illustrates movement of the object within the toolbar 312, the browser display 302 may display the phrase 'Wearable motion sensing' or some other phrase that indicates that wearable motion sensors or wearable motion sensor data was considered in selecting and/or prioritizing the photograph and/or video.

The list of icons 502 may include an icon that illustrates an object, such as the cube 508, associated with object detection. The cube 508 may indicate that a photograph and/or video associated with the cube 508 captured a certain object. Analysis logic, such as the analysis logic 112 may identify the object based on visual analysis, sound analysis and/or a signal transmitted by the object utilized for identification. In response to an interaction with the icon that illustrates the object within the toolbar 312, the browser display 302 may display the phrase 'Object detection' or some other phrase that indicates that the object was detected within the photograph and/or video.

The list of icons 502 may include an icon that illustrates a face, such as the smiley face 510, associated with facial recognition. The smiley face 510 may indicate that a photograph and/or video associated with the smiley face 510 captured a certain individual identified based on facial recognition analysis. In response to an interaction with the icon that illustrates the face within the toolbar 312, the browser display 302 may display the phrase 'Face recognition' or some other phrase that indicates that the certain individual was captured within the photograph and/or video based on facial recognition.

The list of icons 502 may include an icon that illustrates a location indicator, such as the upside-down teardrop with a circle in center 512, associated with location detection. The teardrop 512 may indicate that a photograph and/or video associated with the teardrop 512 captured a certain location and/or was captured in a certain location. Analysis logic, such as the analysis logic 112 may determine that the photograph and/or video is associated with the certain location based on visual recognition of surroundings captured by the photograph and/or video, information (such as GPS location) received from global information systems (such as GIS 110 of FIG. 1), or some combination thereof. In response to an interaction with the icon that illustrates location indicator within the toolbar 312, the browser display 302 may display the phrase 'Location detection' or some other phrase that indicates that the photograph and/or video was associated with the certain location.

The list of icons 502 may include an icon that illustrates a representation of sound, such as the decibel representation 514, associated with audio sensing. The decibel representation 514 may indicate that a photograph and/or video associated with the decibel representation 514 included a certain sound, was selected and/or prioritized based on a certain sound associated with the photograph and/or video, or some combination thereof. In response to an interaction with the icon that illustrates a representation of sound within the toolbar 312, the browser display 302 may display the phrase 'Audio sensing' or some other phrase that indicates that the certain sound is associated with the photograph and/or video.

The list of icons 502 may include an icon that illustrates a scene indicator, such as the mountains 516, associated with scene recognition. The mountains 516 may indicate that a photograph and/or video associated with the mountains 516 captured a certain scene, location, scene associated with a search query/activity, or some combination thereof. For example, analysis logic, such as analysis logic 112 of FIG. 1, may perform visual and/or sound analysis of the scene/environment captured in the photograph and/or video to determine a scene captured by the photograph and/or video. In response to an interaction with the icon that illustrates a scene indicator within the toolbar 312, the browser display 302 may display the phrase 'Scene recognition' or some other phrase that indicates that the certain scene, location, scene associated with the search query/activity, or some combination thereof is associated with the photograph and/or video.

The list of icons 502 may include an icon that illustrates an alternative camera and/or camera angle is available, such as the camera icon 518, associated with an alternative camera and/or camera angle capturing the same scene, subject, individual, or some combination thereof, captured by the displayed photograph and/or video associated with the camera icon 518. In some embodiments, a browser, such as the browser 108 of FIG. 1, may determine that an alternative camera and/or camera angle is available for the displayed photograph and/or video based on a determination that another photograph and/or video captures the same wearable sensor devices, such as the wearable sensor devices 102 of FIG. 1, as the displayed photograph and/or video at a same or similar time and/or location.

In response to cursor being placed on the icon that illustrates an alternative camera and/or camera angle within the toolbar 312 for a period of time (such as 5 seconds), the browser display 302 may display the phrase 'Audio sensing,' some other phrase that indicates that the certain sound is associated with the photograph and/or video, a preview pane displaying the photograph and/or video associated with the alternative camera and/or camera angle, or some combination thereof. In response to a selection and/or clicking of the icon that illustrates an alternative camera and/or camera angle within the toolbar 312, the browser display 302 may replace the displayed photograph and/or video with the alternative photograph and/or video and/or may display a pop-up window or new pane that displays the alternative photograph and/or video.

The list of icons 502 may include an icon that illustrates a speech input, such as microphone icon 520, associated with recorded sounds associated with the photograph and/or video. The microphone icon 520 may indicate that a sound and/or vocal phrase was recorded by a user of a camera (such as camera 104 of FIG. 1) and/or computer device (such as the computer device 106 of FIG. 1) and associated with the photograph and/or video displayed with association to the microphone icon 520. Analysis logic (such as the analysis logic 112 of FIG. 1), prioritization logic (such as the prioritization logic 114 of FIG. 1), and/or a browser (such as the browser 108 of FIG. 1) may utilize the recorded sound and/or vocal phrase in performing analysis, assigning a priority level and/or selecting the photograph and/or video for display. In response to an interaction with the icon that illustrates a speech input within the toolbar 312, the browser display 302 may display the phrase 'Speech input' or some other phrase that indicates that a recorded sound and/or vocal phrase is associated with the photograph and/or video.

Figure 6A:
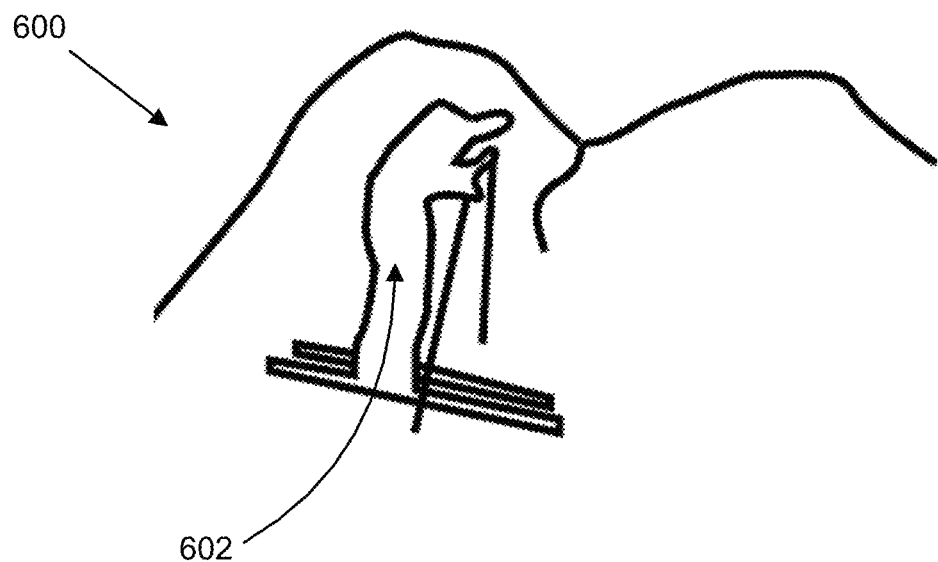
FIG. 6A illustrates an example captured media image, according to various embodiments.

FIG. 6A illustrates an example captured media image 600, according to various embodiments. A camera, such as camera 104 of FIG. 1, may capture and/or generate the captured media image 600. The camera may include a stand-alone camera or a camera built into another computer device, such as a smartphone. The camera may include one or more of the features described in relation to the camera 104 of FIG. 1.

The captured media image 600 may have captured one or more wearable sensor devices, such as wearable sensor device 602 worn by the subject captured in the image. The wearable sensor devices 602 may include one or more of the features of the wearable sensor devices 102 of FIG. 1. The wearable sensor devices may be coupled to the camera and may provide data to the camera (or a computer device coupled to or hosting the camera) in accordance with any of the methods of communicating data between wearable sensor devices and cameras/computer devices described throughout this disclosure, such as the communication of data between wearable sensor devices 102 and camera 104/computer device 106 of FIG. 1. The data communicated by the wearable sensor devices may include a location of each of the wearable sensor devices, a location of each of the wearable sensor devices relative to the camera, or some combination thereof.

In some embodiments, a browser, such as browser 108 of FIG. 1, may identify certain objects, such as the snowboard being ridden by the subject, the coat being worn by the subject, or similar objects. The browser may identify the objects based on visual analysis of the captured media image 600. Identification of the objects may include identifying a certain color, a certain combination of colors, a certain shape, or some combination thereof, within the captured media image 600. The browser 108 and/or the computer device 106 of FIG. 1 may identify the objects and may determine a location of the objects, a location of the objects relative to the camera, or some combination thereof.

Figure 6B:
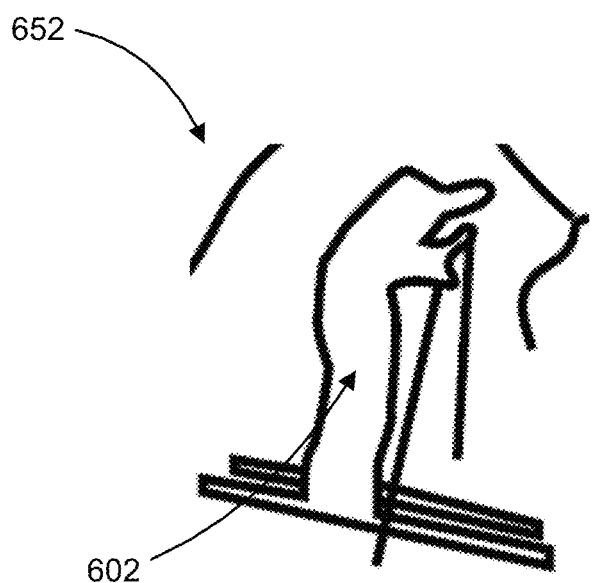
FIG. 6B illustrates a modified image of the example captured media image of FIG. 6A, according to various embodiments.

FIG. 6B illustrates a modified image 652 of the example captured media image 600 of FIG. 6A, according to various embodiments. The browser and/or the computer device may produce the modified image 652. The browser and/or computer device may produce the modified image 652 based on the wearable sensor devices, data received from the wearable sensor devices, the identified objects 608, or some combination thereof. The browser and/or the computer device may produce the modified image 652 by zooming in on a portion of the captured media image 600, zooming in on one or more of the wearable sensor devices captured by the captured media image 600, cropping the captured media image 600, or some combination thereof. In some embodiments, the browser and/or the computer device may perform visual imprinting on a subject within the modified image 652 and may generate the modified image 652 based on the visual imprinting.

In some embodiments, the browser and/or computer device may produce the modified image 652 by zooming in and/or cropping a portion of the image 600 such that a border of the modified image 652 is a certain distance from the wearable sensor device 602, includes a certain portion of the image 600 relative to the wearable sensor device 602, or some combination thereof. The browser and/or the computer device may further, or alternatively, produce the modified image by zooming in and/or cropping based on other wearable sensor devices appearing within the captured media image 600 and/or the modified image 652, the identified objects appearing in the captured media image 600 and/or the modified image 652, or some combination thereof.

In some embodiments of the browser display, such as the browser display described in relation to FIG. 1 and/or the browser display 302 of FIG. 3, the browser display may display the modified image 652 in the presentation space allocated for the video and/or photograph corresponding to the image rather than the captured media image 600. The browser and/or computer device may predetermine whether to display the captured media image 600 or the modified image 652 in the browser display. In some embodiments the browser and/or the computer device may determine whether to display the captured media image 600 or the modified image 652 in the browser display based on an input by a user of the browser or a viewer of the browser display, the data received from the wearable sensor devices, or some combination thereof.

Figure 7:
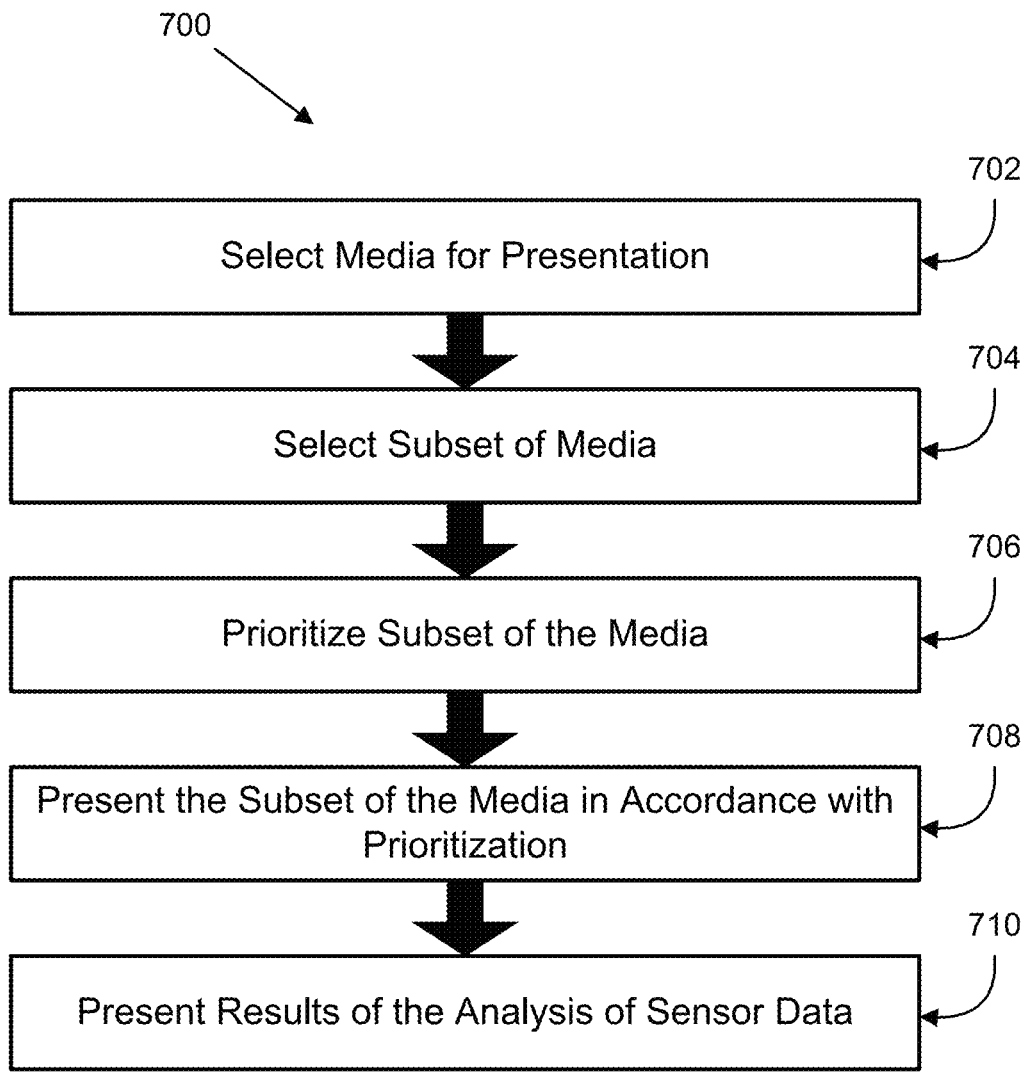
FIG. 7 illustrates an example process for prioritization of media, according to various embodiments.

FIG. 7 illustrates an example process 700 for prioritization of media, according to various embodiments. The process 700 may include block 702, where a browser and/or computer device, such as browser 108 and/or computer device 106 of FIG. 1, selects media, such as video and/or photographs, for display in a browser display, such as the browser display described in relation to FIG. 1 and/or the browser display 302 of FIG. 3. The browser and/or computer device may select the videos and/or photographs by any of the methods described throughout this disclosure, including selection of the videos and/or photographs based on the inclusion of wearable sensor devices captured within the videos and/or photographs, the data received from the wearable sensor devices, the level of interest of each video and/or photograph, or some combination thereof.

The process 700 may further include block 704, where the browser and/or computer device selects a subset of media from the media selected in block 702. The browser and/or computer device may select the subset of the media based on inclusion of wearable sensor devices captured by media within the subset, data received from the wearable sensor devices, the level of interest of the media determined by the analysis logic 112 of FIG. 1, or some combination thereof. The browser and/or the computer device may select the subset to include media that captures a greater amount of wearable sensor device, media with greater corresponding interest weights, or some combination thereof, than other media within the media selected in block 702. The browser and/or computer device may determine the amount of media to be selected within the subset based on a predetermined amount, on the interest weights, or some combination thereof.

The process 700 may further include block 706, where the prioritization logic 114 prioritizes the subset of the media. Prioritization of the subset of media may include assigning each of the media within the subset to an allocated preferred presentation space, such as preferred presentation space 206 of FIG. 2, level-two preferred presentation spaces 306 of FIG. 3, level-one preferred presentation spaces 308 of FIG.

3, or some combination thereof. The browser and/or the computer device may assign the other media within the media selected in block 702, but not included in the subset, to regular presentation spaces, such as regular presentation spaces 204 of FIG. 2, regular presentation spaces 304 of FIG. 3, or some combination thereof.

The process 700 may further include block 708, where a browser display, such as the browser display described in relation to FIG. 1 and/or the browser display 302 of FIG. 3, presents the subset of the media in accordance with the prioritization performed in block 706. The presentation of block 708 may include presentation of the subset of the media, in preferred presentation spaces, and the other media selected within block 702, in regular presentation spaces, within a browser display.

The process 700 may further include block 710, where the browser display presents the results from the analysis of sensor data from the wearable sensor devices, such as wearable sensor devices 102 of FIG. 1 and wearable sensor devices 604 and 606 of FIG. 5. Presentation of the results may include presenting factor icons, such as factor icons 310 of FIG. 3, with the media displayed in the browser display.

Figure 8:
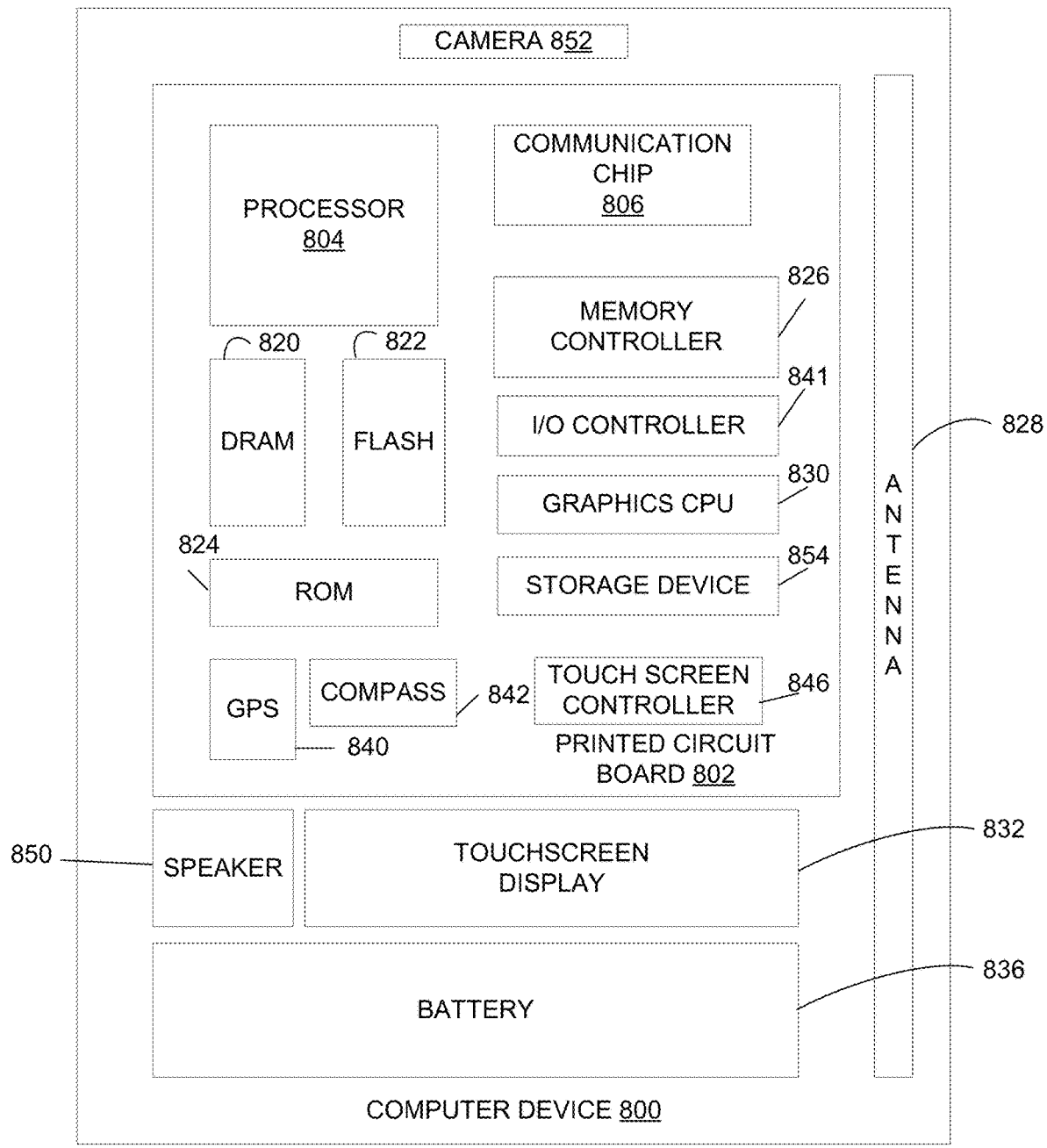
FIG. 8 illustrates an example computer device that may employ the apparatuses and/or methods described herein.

FIG. 8 illustrates an example computer device 800 that may employ the apparatuses and/or methods described herein (e.g., the camera 104, the computer device 106, the browser 108, the browser display 302, and/or the process 700), in accordance with various embodiments. As shown, computer device 800 may include a number of components, such as one or more processor(s) 804 (one shown) and at least one communication chip 806. In various embodiments, the one or more processor(s) 804 each may include one or more processor cores. In various embodiments, the at least one communication chip 806 may be physically and electrically coupled to the one or more processor(s) 804. In further implementations, the communication chip 806 may be part of the one or more processor(s) 804. In various embodiments, computing device 800 may include printed circuit board (PCB) 802. For these embodiments, the one or more processor(s) 804 and communication chip 806 may be disposed thereon. In alternate embodiments, the various components may be coupled without the employment of PCB 802.

Depending on its applications, computer device 800 may include other components that may or may not be physically and electrically coupled to the PCB 802. These other components include, but are not limited to, memory controller 826, volatile memory (e.g., dynamic random access memory (DRAM) 820), non-volatile memory such as read only memory (ROM) 824, flash memory 822, storage device 854 (e.g., a hard-disk drive (HDD)), an I/O controller 841, a digital signal processor (not shown), a crypto processor (not shown), a graphics processor 830, one or more antenna 828, a display (not shown), a touch screen display 832, a touch screen controller 846, a battery 836, an audio codec (not shown), a video codec (not shown), a global positioning system (GPS) device 840, a compass 842, an accelerometer (not shown), a gyroscope (not shown), a speaker 850, a camera 852, and a mass storage device (such as hard disk drive, a solid state drive, compact disk (CD), digital versatile disk (DVD)) (not shown), and so forth.

In some embodiments, the one or more processor(s) 804, flash memory 822, and/or storage device 854 may include associated firmware (not shown) storing programming instructions configured to enable computer device 800, in response to execution of the program instructions by one or more processor(s) 804, to practice all or selected aspects of the methods described herein. In various embodiments, these aspects may additionally or alternatively be implemented using hardware separate from the one or more processor(s) 804, flash memory 822, or storage device 854.

In various embodiments, one or more components of the computer device 800 may include the camera 104, the computer device 106, the analysis logic 112, the prioritization logic 114 and/or the browser 108, described herein. For example, the camera 104, the computer device 106, the browser 108, and/or the GIS 110 may be included in I/O controller 841, processor 804, memory controller 826, and/or another component of computer device 800. In some embodiments, I/O controller 841 may interface with the camera 104, the computer device 106, the browser 108, and/or the GIS 110 to perform any of the processes and/or features described throughout this disclosure.

The communication chips 806 may enable wired and/or wireless communications for the transfer of data to and from the computer device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 800 may include a plurality of communication chips 806. For instance, a first communication chip 806 may be dedicated to shorter range wireless communications such as Wi-Fi and Bluetooth, and a second communication chip 806 may be dedicated to longer range wireless communications such as GPS, EDGE, GPRS, CDMA, WiMAX, LTE, Ev-DO, and others.

In various implementations, the computer device 800 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computer device 800 may be any other electronic device that processes data.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of program instructions 904. Program instructions 904 may be configured to enable a device, e.g., camera 104, computer device 106, analysis logic 112, prioritization logic 114 and/or browser 108, in response to execution of the program instructions, to implement (aspects of) the process 700 and/or any other processes and features described throughout the disclosure. In alternate embodiments, program instructions 904 may be disposed on multiple computer-readable non-transitory storage media 902 instead. In still other embodiments, program instructions 904 may be disposed on computer-readable transitory storage media 902, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Example 1 may include a system for presentation of media, that includes photos or videos, comprising one or more processors, analysis logic to receive sensor data collected by a plurality of wearable sensors, and to determine a level of interest of a user based on the sensor data, the plurality of wearable sensors to be worn by at least one subject associated with the photos or videos, prioritization logic to prioritize a subset of a plurality of photos or videos over other photos or videos from the plurality of the photos or videos in terms of presentation space allocated for presentation based on the level of interest and a browser, operated by the one or more processors, to present the subset and the other photos or videos, in accordance with prioritization of the subset over the other photos or videos in terms of presentation space allocated for presentation, for viewing.

Example 2 may include the system of example 1, wherein the subset of the plurality of the photos or videos is associated with a wearable sensor, from the plurality of wearable sensors, that provides a sensor value that exceeds a corresponding threshold value.

Example 3 may include the system of example 1, wherein for each photo or video of the subset of the plurality of the photos or videos the browser is to allocate a larger presentation space for presentation than the other photos or videos.

Example 4 may include the system of any of the examples 1-3, wherein the browser is to present each photo or video of the subset of the plurality of the photos or videos with an icon that indicates that the photo or video is associated with the plurality of wearable sensors.

Example 5 may include the system of any of the examples 1-3, wherein the browser is to present the subset and the other photos or videos in response to a reception of a search query by the browser.

Example 6 may include the system of example 5, wherein determination of the level of interest by the analysis logic includes determination that at least one of the plurality of wearable sensors is associated with the search query.

Example 7 may include the system of example 5, wherein the browser is to present an icon with a presentation of at least one of the photos or videos within the subset of the plurality of the photos or videos, wherein the icon is to indicate an attribute for which the at least one of the photos or videos was selected for display based on the search query.

Example 8 may include the system of any of the examples 1-3, wherein the analysis logic is further to identify at least one of the plurality of wearable sensors associated with an increase in the level of interest, and wherein the browser is to present the subset of the plurality of the photos or videos with at least a portion of the subset presented with each of the photos or videos zoomed in on the at least one of the plurality of wearable sensors.

Example 9 may include the system of any of the examples 1-3, wherein the browser is to further present at least one graph that displays results of determination of the level of interest.

Example 10 may include the system of any of the examples 1-3, wherein the subset of the plurality of the photos or videos is selected by a content provider.

Example 11 may include a computer-implemented method for presentation of media, including photos or videos, comprising analyzing, by analysis logic coupled to prioritization logic of a computer device, sensor data associated with media collected from a plurality of wearable sensors to determine an interest level of the media, prioritizing, by the prioritization logic coupled to a browser of the computer device, a subset of the media over other photos or videos of the media in terms of presentation space allocated for presentation based on the interest level of the media; and presenting, by the browser, the subset of the media and the other photos or videos in accordance with the prioritizing of the subset of the media over the other photos or videos.

Example 12 may include the method of example 11, wherein results of the analyzing of the sensor data indicates that each photo or video within the subset of the media is associated with at least one wearable sensor, from the plurality of wearable sensors, that provides a sensor value that exceeds a corresponding threshold value.

Example 13 may include the method of example 11, wherein presenting the subset of the media and the other photos or videos includes allocating to each photo or video within the subset of the media a larger presentation space than the other photos or videos.

Example 14 may include the method of any of the examples 11-13, wherein presenting the subset of the media and the other photos or videos includes presenting each photo or video within the subset of the media with an icon that indicates that the photo or video is associated with the plurality of wearable sensors.

Example 15 may include the method of any of the examples 11-13, further comprising receiving, by the browser, a search query, and transmitting, by the browser, the search query to the analysis logic, wherein determination of the interest level of the media is further based on the search query.

Example 16 may include the method of example 15, further comprising determining, by the analysis logic, that at least one of the plurality of wearable sensors is associated with the search query, wherein the prioritizing of the subset of the media over the other photos or videos is further based on the determining that the at least one of the plurality of sensors is associated with the search query.

Example 17 may include the method of example 15, further comprising presenting, by the browser, an icon with at least one of the media included in the subset of media, wherein the icon indicates an attribute of the at least one of the media associated with the search query.

Example 18 may include the method of any of the examples 11-13, wherein presenting, by the browser, comprises presenting the subset of the media with at least a portion of the subset of the media presented with each of the media zoomed in on at least one of the plurality of wearable sensors based on the analyzing, by the analysis logic, of the sensor data.

Example 19 may include the method of any of the examples 11-13, further comprising presenting, by the browser, at least one graph that displays results of the analyzing, by the analysis logic, of the sensor data.

Example 20 may include the method of any of the examples 11-13, wherein the subset of the media is selected by a content provider.

Example 21 may include one or more computer-readable media having instructions stored thereon, wherein the instructions, in response to execution by a device, cause the device to present media, that includes photos or videos, for viewing within a browser, wherein a subset of the media is selected based on results of analysis of sensor data collected by a plurality of wearable sensors associated with the subset of the media, and wherein the presentation of the media includes prioritization of the subset of the media over other photos or videos included in the media in terms of presentation space allocated for presentation.

Example 22 may include the computer-readable media of example 21, wherein the results of the analysis of the sensor data indicates that each photo or video of the subset of the media is associated with a wearable sensor that provides a sensor value that exceeds a threshold value.

Example 23 may include the computer-readable media of example 21, wherein to present comprises for each photo or video of the subset of the media, to allocate a larger presentation space for presentation than the other photos or videos.

Example 24 may include the computer-readable media of any of the examples 21-23, wherein to present comprises to present each photo or video of the subset of the media with an icon that indicates that the photo or video is associated with the plurality of wearable sensors.

Example 25 may include the computer-readable media of any of the examples 21-23, wherein the media presented for viewing within the browser is selected based on a search query received by the browser.

Example 26 may include the computer-readable media of example 25, wherein the instructions further cause the device to determine that at least one of the plurality of wearable sensors is associated with the search query.

Example 27 may include the computer-readable media of example 25, wherein the instructions further cause the device to present an icon with a presentation of at least one of the media presented within the browser, wherein the icon indicates an attribute for which the at least one of the media was selected based on the search query.

Example 28 may include the computer-readable media of any of the examples 21-23, the subset of the media is presented within the browser with at least a portion of the subset presented with each of the photos or videos within the portion zoomed in on at least one of the plurality of wearable sensors based on the results of the analysis of the sensor data.

Example 29 may include the computer-readable media of any of the examples 21-23, wherein the instructions further cause the device to present at least one graph that displays the results of the analysis of sensor data for viewing within the browser.

Example 30 may include the computer-readable media of any of the examples 21-23, wherein the subset of the media is selected by a content provider.

Example 31 may include an apparatus for presentation of media, which includes photos or videos, comprising means for analyzing sensor data associated with media collected from a plurality of wearable sensors to determine an interest level of the media, means for prioritizing a subset of the media over other photos or videos of the media in terms of presentation space allocated for presentation based on the interest level of the media, and means for presenting the subset of the media and the other photos or videos in accordance with the prioritizing of the subset of the media over the other photos or videos.

Example 32 may include the apparatus of example 31, wherein results of the analyzing of the sensor data indicates that each photo or video within the subset of the media is associated with at least one wearable sensor, from the plurality of wearable sensors, that provides a sensor value that exceeds a corresponding threshold value.

Example 33 may include the apparatus of example 31, wherein the means for presenting comprises means for allocating, for each photo or video within the subset of the media, a larger presentation space than the other photos or videos.

Example 34 may include the apparatus of any of the examples 31-33, wherein means for presenting comprises means for presenting each photo or video within the subset of the media with an icon that indicates that the photo or video is associated with the plurality of wearable sensors.

Example 35 may include the apparatus of any of the examples 31-33, further comprising means for receiving a search query, and means for transmitting the search query to the analysis logic, wherein determination of the interest level of the media is further based on the search query.

Example 36 may include the apparatus of example 35, further comprising means for determining that at least one of the plurality of wearable sensors is associated with the search query, wherein the selection of the subset of the media is based on determining that the at least one of the plurality of wearable sensors is associated with the search query.

Example 37 may include the apparatus of example 35, wherein means for presenting comprises means for presenting an icon with a presentation of at least one of the media, wherein the icon indicates an attribute for which the at least one of the media was selected based on the search query.

Example 38 may include the apparatus of any of the examples 31-33, wherein means for presenting comprises means for presenting the subset of the media with at least a portion of the subset of the media presented with each of the media zoomed in on at least one of the plurality of wearable sensors based on results of the analysis of the sensor data.

Example 39 may include the apparatus of any of the examples 31-33, further comprising means for presenting at least one graph that displays results of the analysis of the sensor data.

Example 40 may include the apparatus of any of the examples 31-33, wherein the subset of the media is selected by a content provider.

What is claimed is:

1. A system for presentation of media, that includes photos or videos, comprising:
   one or more hardware processors;
   analysis logic, operated by the one or more hardware processors, to receive sensor data collected by a plurality of wearable sensors while a plurality of photos or videos were taken, and to determine levels of interest of different subsets of the plurality of photos or videos to a viewing user of the plurality of photos or videos, based on the sensor data, wherein the plurality of wearable sensors include at least a motion sensor and another sensor worn by at least one subject in at least some of the photos or videos to respectively collect motion and other sensor data while the photos or videos were taken, the other sensor data including other sensor data of the subject or a surrounding environment of the subject; wherein the sensor data are correlated with the plurality of photos or videos to determine the different subsets and the corresponding levels of interest; and
   prioritization logic, operated by the one or more processors, to prioritize the subsets of the plurality of photos or videos based at least in part on the levels of interest determined;
   wherein a result of the prioritization is to control presentation of the subsets of photos or videos in a plurality of presentation spaces, for viewing by the viewing user, and to control which presentation spaces within the plurality of presentation spaces to display the subsets of photos or videos.

2. The system of claim 1, wherein the motion sensor comprises an accelerometer or a gyroscope.

3. The system of claim 1, wherein the other sensor comprises a biometric sensor to capture biometric sensor data of the subject; and wherein the analysis logic further determines the levels of interest of the different subsets of the plurality of photos or videos to the viewing user of the plurality of photos or videos, based on the biometric sensor data.

4. The system of claim 3, wherein the biometric sensor data include heart rate, breathing pattern, or body temperature data.

5. The system of claim 1, wherein the other sensor comprises an environmental sensor to capture environmental sensor data about the surrounding environment; and wherein the analysis logic further determines the levels of interest of the different subsets of the plurality of photos or videos to the viewing user of the plurality of photos or videos, based on the environmental sensor data.

6. The system of claim 5, wherein the environmental sensor data about the surrounding environment include sound, temperature, humidity, light, or pressure sensor data about the surrounding environment.

7. The system of claim 1, wherein the analysis logic is to further determine the levels of interest of the different subsets of the plurality of photos or videos to the viewing user based on one of more analytics of the plurality of photos or videos.

8. The system of claim 7, wherein the one or more analytics include visual or audio analytics correlated with the plurality of photos or videos.

9. The system of claim 8, wherein the visual analytics correlated with the plurality of photos or videos comprise face recognition, event recognition, or landscape recognition analytics correlated with the plurality of photos or videos.

10. The system of claim 8, wherein the audio analytics correlated with the plurality of photos or videos comprises audio recognition analytics correlated with the plurality of photos or videos.

11. A computer-implemented method for presentation of media, including photos or videos, comprising:
analyzing, by analysis logic coupled to prioritization logic of a computer device, sensor data associated with media collected from a plurality of wearable sensors while the media were created, to determine interest levels of various subsets of the media to a viewing user, wherein the plurality of wearable sensors include at least a motion sensor and another sensor worn by at least one subject in at least some of the media to respectively collect motion and other sensor data while the media were created, the other sensor data including other sensor data of the subject or a surrounding environment of the subject; wherein the sensor data received are correlated with the various subsets of the media to determine different subsets and the corresponding levels of interest; and
prioritizing, by the prioritization logic, the media in terms of a type of presentation space allocated, based at least in part on the levels of interest determined;
wherein a result of the prioritization is used to control presentation of the subsets of the media in a plurality of presentation spaces, for viewing by the viewing user, and to control which presentation spaces within the plurality of presentation spaces to display the subsets of photos or videos.

12. The method of claim 11, wherein the motion sensor comprises an accelerometer or a gyroscope, and the other sensor comprises a biometric sensor to capture biometric sensor data of the subject; and wherein the analysis logic further determines the levels of interest of the different subsets of the plurality of photos or videos to the viewing user of the plurality of photos or videos, based on the biometric sensor data.

13. The method of claim 11, wherein the other sensor comprises an environmental sensor to capture environmental sensor data about the surrounding environment; and wherein the analysis logic further determines the levels of interest of the different subsets of the plurality of photos or videos to the viewing user of the plurality of photos or videos, based on the environmental sensor data.

14. The method of claim 11, wherein the analysis logic is to further determine the levels of interest of the different subsets of the plurality of photos or videos to the viewing user based on one of more analytics of the plurality of photos or videos.

15. The method of claim 14, wherein the one or more analytics include visual or audio analytics correlated with the plurality of photos or videos.

16. The method of claim 15, wherein the visual analytics correlated with the plurality of photos or videos comprise face recognition, event recognition, or landscape recognition analytics correlated with the plurality of photos or videos.

17. The method of claim 15, wherein the audio analytics correlated with the plurality of photos or videos comprises audio recognition analytics correlated with the plurality of photos or videos.

18. One or more non-transitory computer-readable media having instructions stored thereon, wherein the instructions, in response to execution by a device, cause the device to:
present a selected subset of media, that includes photos or videos, for viewing;
wherein the subset of the media being presented is selected from a plurality of subsets of media based on interest levels determined through analysis of sensor data collected by a plurality of wearable sensors, the sensor data being collected by the plurality of wearable sensors while the plurality of subsets of media were created, wherein the plurality of wearable sensors include at least a motion sensor and another sensor worn by at least one subject in the plurality of subsets of media to respectively collect motion and other sensor data while the plurality of subsets of media were created, the other sensor data including other sensor data of the subject or a surrounding environment of the subject, wherein the sensor data received are correlated with the plurality of subsets of media to determine the corresponding levels of interest; and
wherein the presentation of the selected subsets of media includes prioritization of the selected subsets of the media based on the corresponding levels of interest, and to control which presentation spaces within the plurality of presentation spaces to display the subsets of photos or videos.

19. The one or more non-transitory computer-readable media of claim 18, wherein the motion sensor comprises an accelerometer or a gyroscope.

20. The one or more non-transitory computer-readable media of claim 18, wherein the other sensor comprises a biometric sensor to capture biometric sensor data of the subject; and wherein the levels of interest of the different subsets of the plurality of photos or videos are further determined based on the biometric sensor data.

21. The one or more non-transitory computer-readable media of claim 18, wherein the other sensor comprises an environmental sensor to capture environmental sensor data about the surrounding environment; and wherein the levels of interest of the different subsets of the plurality of photos or videos are further determined based on the environmental sensor data.

22. The one or more non-transitory computer-readable media of claim 18, wherein the levels of interest of the different subsets of the plurality of photos or videos are further determined based on one of more analytics of the plurality of photos or videos.

23. The one or more non-transitory computer-readable media of claim 22, wherein the one or more analytics include visual or audio analytics correlated with the plurality of photos or videos.

24. The one or more non-transitory computer-readable media of claim 23, wherein the visual analytics correlated with the plurality of photos or videos comprise face recognition, event recognition, or landscape recognition analytics correlated with the plurality of photos or videos.

25. The one or more non-transitory computer-readable media of claim 23, wherein the audio analytics correlated with the plurality of photos or videos comprises audio recognition analytics correlated with the plurality of photos or videos.

* * * * *

UNITED STATES PATENT AND TRADEMARK OFFICE
CERTIFICATE OF CORRECTION

PATENT NO. : 11,782,572 B2
APPLICATION NO. : 16/889584
DATED : October 10, 2023
INVENTOR(S) : Glen J. Anderson et al.

It is certified that error appears in the above-identified patent and that said Letters Patent is hereby corrected as shown below:

In the Claims

Column 24
Line 51, "...based on one of more analytics..." should read "...based on one or more analytics..."

Signed and Sealed this
Eighth Day of October, 2024

Katherine Kelly Vidal
*Director of the United States Patent and Trademark Office*